(12) United States Patent
You

(10) Patent No.: US 6,289,179 B1
(45) Date of Patent: Sep. 11, 2001

(54) POWER SUPPLYING DEVICE FOR FLASHES

(76) Inventor: Jeng-Hwang You, P.O. Box 82-144, Taipei (TW)

( * ) Notice: Subject to any disclaimer, the term of this patent is extended or adjusted under 35 U.S.C. 154(b) by 0 days.

(21) Appl. No.: 09/201,706

(22) Filed: Dec. 1, 1998

(51) Int. Cl.$^7$ ................................. G03B 7/26; H02J 7/00
(52) U.S. Cl. ......................... 396/205; 396/301; 307/150
(58) Field of Search ................................. 396/205, 206, 396/278, 279, 283, 301; 307/150

(56) References Cited

U.S. PATENT DOCUMENTS

| | | | |
|---|---|---|---|
| 5,151,727 | * | 9/1992 | Sasaki ................................. 396/301 |
| 5,164,761 | * | 11/1992 | Isono et al. .......................... 396/301 |
| 5,630,193 | * | 5/1997 | Miyake et al. ....................... 396/539 |

* cited by examiner

*Primary Examiner*—Christopher E. Mahoney
(74) *Attorney, Agent, or Firm*—A & J

(57) ABSTRACT

A power supplying device for flashes includes a base having a bottom formed with two opposite grooves, a threaded hole vertically extending therethrough, and two threaded holes, at least a rechargeable battery having a top provided with two conducting terminals and a protuberance, an extension cord provided at one end with a plug engageable with a power socket of the battery and at another end with a socket, and a power cord having an end provided with a plug engageable with the socket of the extension cord and another end provided with a positive and negative wires each provided with a metal conductor. One of the wires has a buzzer. A circuit protecting switch and a metal conductor are fitted within a cylinder with the metal conductor partially projected out of an end of the cylinder. Another one of the wires is provided at an end with a metal conductor which is fitted within another cylinder and partially extends out of the cylinder. Hence, the power supplying device can be easily mounted on the camera platform of a camera for supplying power to the flash of the camera.

1 Claim, 7 Drawing Sheets

POWER SUPPLYING DEVICE FOR FLASHES

BACKGROUND OF THE INVENTION

1. Field of the Invention

This invention is related to an improved power supplying device for flashes.

2. Description of the Prior Art

In the art of photography, artificial light is commonly used to illuminate an object to be photographed. One form of artificial light which is now widely used is that produced by the so-called electric flash device. However, such flash device is usually powered by four No. 3 batteries and consumes a lot of electric power so that when the batteries run down, they have to be disposed thereby wasting money and causing pollution to the environment. Furthermore, when the power of the batteries is below a certain level, the charging speed of the flash will become slow thus requiring it to wait for the charge of the flash and often missing the chance to take a snapshot. Hence, a storage battery has been proposed to supply power to the flash, but such a storage battery is bulky in volume and inconvenient to carry and requires a lengthy conducting wire to connect the battery to the flash which will often trip up someone.

Therefore, it is an object of the present invention to provide an improved power supplying device for flashes which can obviate and mitigate the above-mentioned drawbacks.

SUMMARY OF THE INVENTION

This invention is related to a power supplying device for flashes.

According to a preferred embodiment of the present invention, a power supplying device for flashes includes a base having a bottom formed with two opposite grooves, a threaded hole vertically extending therethrough, and two threaded holes, at least a rechargeable battery having a top provided with two conducting terminals and a protuberance, an extension cord provided at one end with a plug engageable with a power socket of the battery and at another end with a socket, and a power cord having an end provided with a plug engageable with the socket of the extension cord and another end provided with a positive and negative wires each provided with a metal conductor, one of the wires having a buzzer, a circuit protecting switch and a metal conductor which are fitted within a cylinder with the metal conductor partially projected out of an end of the cylinder, another one of said wires being provided at an end with a metal conductor which is fitted within another cylinder and partially extends out of the cylinder.

It is the primary object of the present invention to provide a power supplying device for flashes which can be easily mounted on the camera platform of a camera.

It is another object of the present invention to provide a power supplying device for flashes which is convenient to use.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
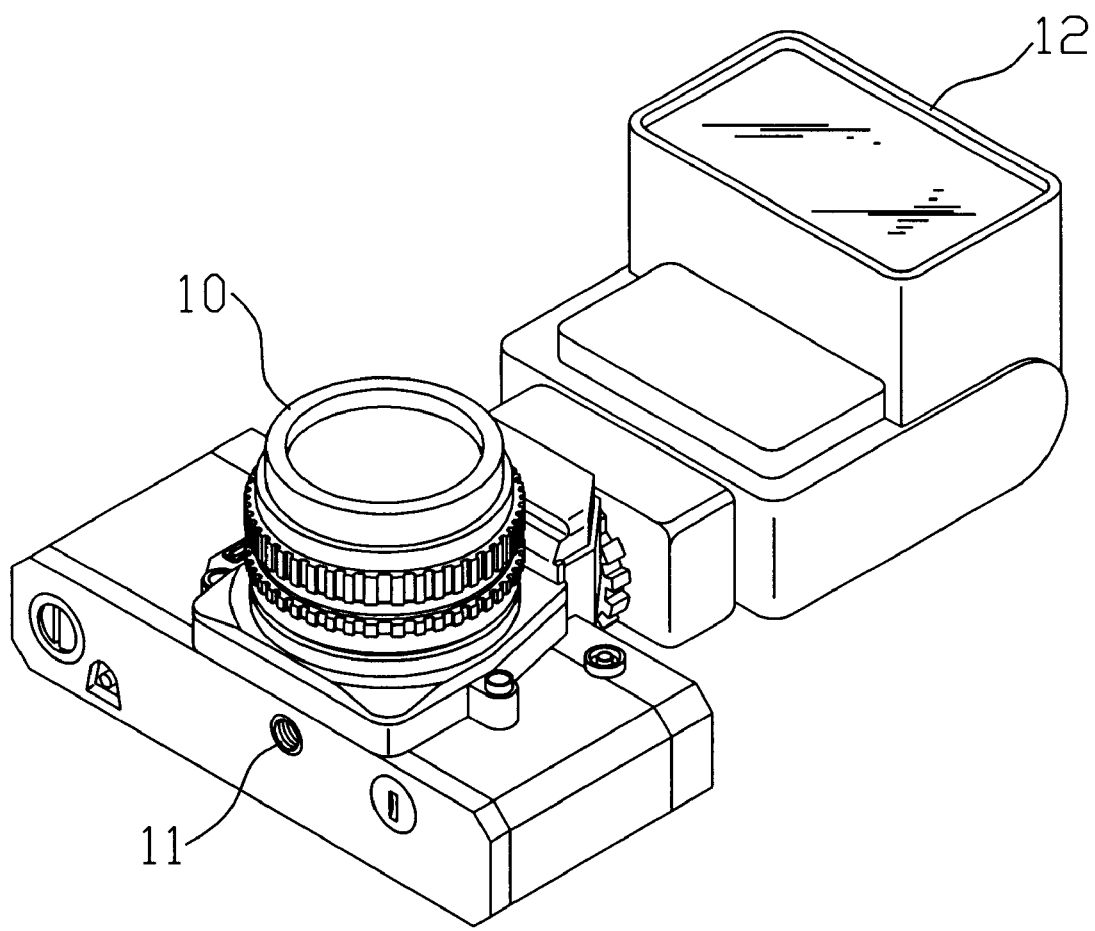
FIG. 1 is a perspective view of a prior art camera.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

FIG. 1 illustrates a camera 10 provided with a flash 12 at the top and a threaded hole 11 at the bottom adapted to be mounted on the camera platform of a tripod.

Figure 2:
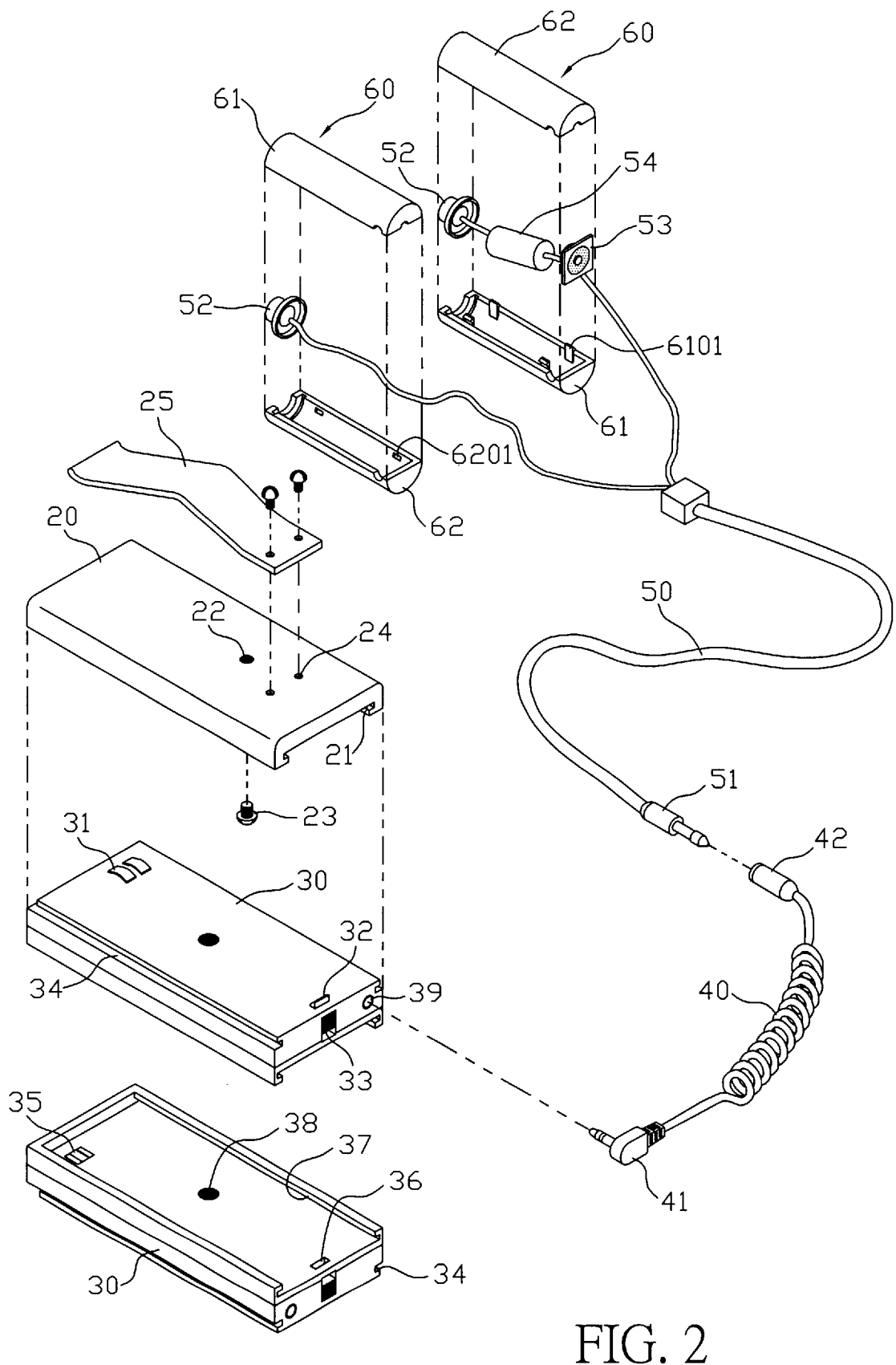
FIG. 2 is an exploded view of the present invention.
Figure 3:
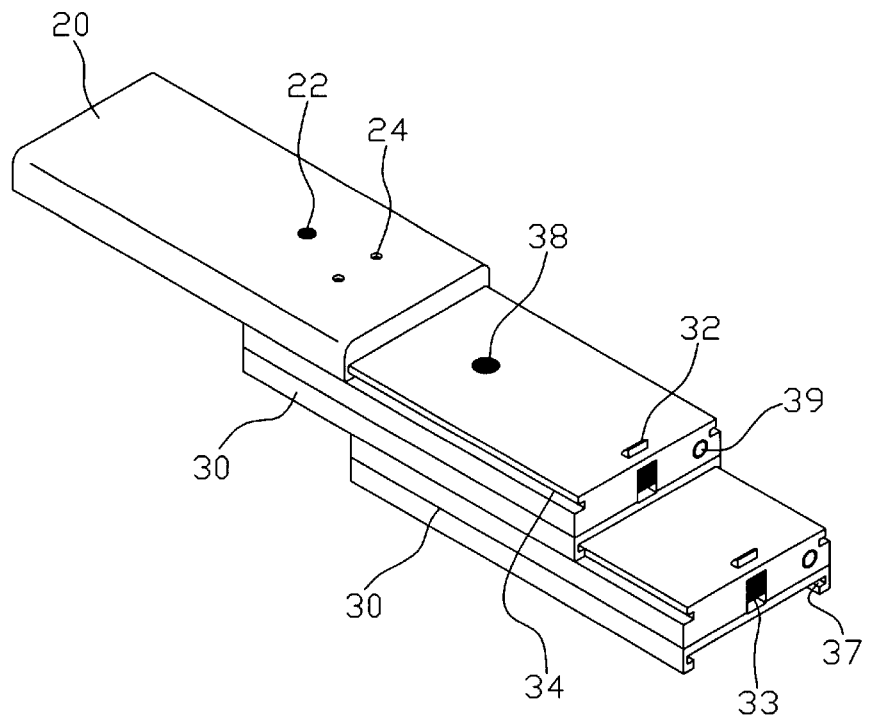
FIG. 3 illustrates the engagement between the base and the batteries.
Figure 4:
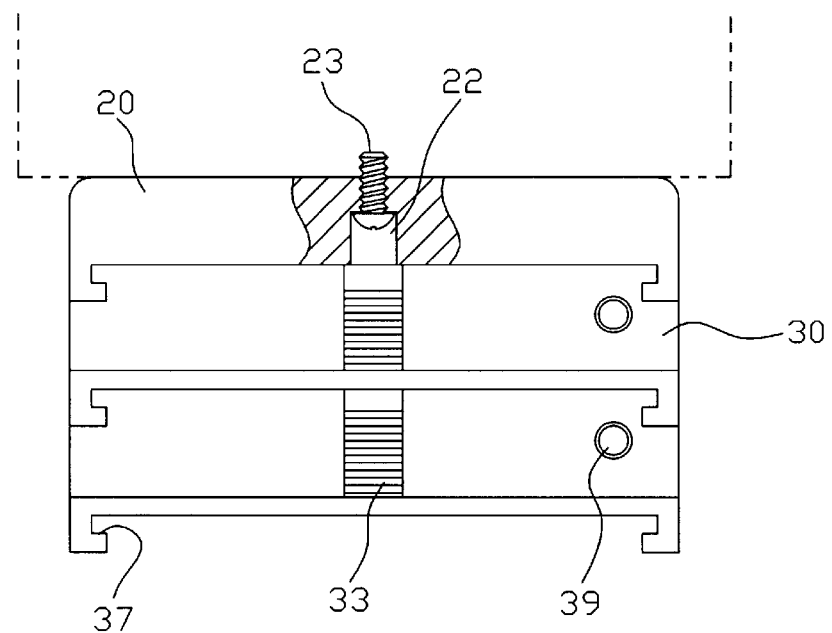
FIG. 4 is a sectional view showing the engagement between the base and the batteries.

With reference to the drawings and in particular to FIGS. 2, 3 and 4 thereof, the power supplying device for flashes according to the present invention generally comprises a base 20, a rechargeable battery 30, a power extension cord 40 and a power cord 50.

The base 20 is formed with two opposite grooves 21 at the bottom, a threaded hole 22 vertically extending therethrough, and two threaded holes 24 for mounting a clip 25 thereon by screws (shown but not numbered).

The rechargeable battery 30 is provided on the top with conducting terminals 31 and a protuberance 32. The protuberance 32 is connected to a button 33 so that the protuberance 32 can be controlled to move into the battery 30 by depressing the button 33. Two opposite sides of the battery 30 are formed with two longitudinal flanges 34 configured to engage with the grooves 21 of the base 20. The bottom of the battery 30 is provided with two grooves 37 at two opposite sides (see FIG. 2) configured to engage with the flanges 34 of another battery 30, a conducting member 35 and a recess 36 respectively engageable with the conducting terminal 31 and the protuberance 32 of another battery 30. The central portion of the battery 30 has a vertical threaded hole 38 adapted to engage with a camera platform (not shown) of a tripod (not shown). A power socket 39 is provided close to the button 33 for supplying power.

As two (or more) batteries 30 are engaged, the conducting terminal 31 of one of the batteries 30 will be electrically connected with the conducting member 35 of another one of te batteries 30 thereby connecting the two batteries in parallel. Meanwhile, the protuberance 32 of the lower one of the batteries 30 is engaged with upper one of the batteries 30. The two batteries 30 can be easily separated by depressing the button 33.

The extension cord 40 is provided at one end with a plug 41 adapted to engage the power socket 39 of the battery 30 and at another end with a socket 42 adapted to engage a plug 51 of the power cord 50. The plug 51 of the power cord 50 can also engage with the power socket 39 of the battery 30.

The other end of the power cord 50 is provided with a positive and a negative wires each connected with a metal conductor 52. One of the wires has a buzzer 53, a circuit protecting switch 54 and a metal conductor 52 which are fitted within a cylinder 60 with the metal conductor 52 partially projected out of an end of the cylinder 60. The cylinder 60 has the same size of a battery and composed of a first cover 61 provided with protuberances 6101 and a second cover provided with cavities 6201 configured to engage with the protuberances 6101. Another one of the wires is provided at the end with a metal conductor 52 which is fitted within another cylinder 60 and partially extends out of the cylinder 60. The circuit protecting switch 54 is used for cutting off the power supply in case of short circuit and turning on the buzzer 53 at the same time so as to arouse the user to check the polarity thereby preventing the flash tube (not shown) from burning. The circuit protecting switch 54 is designed so that it will recover to enable current to pass therethrough when a spring leaf (not shown) in the switch 54 is cooled to normal temperature in about 10 seconds.

Figure 5:
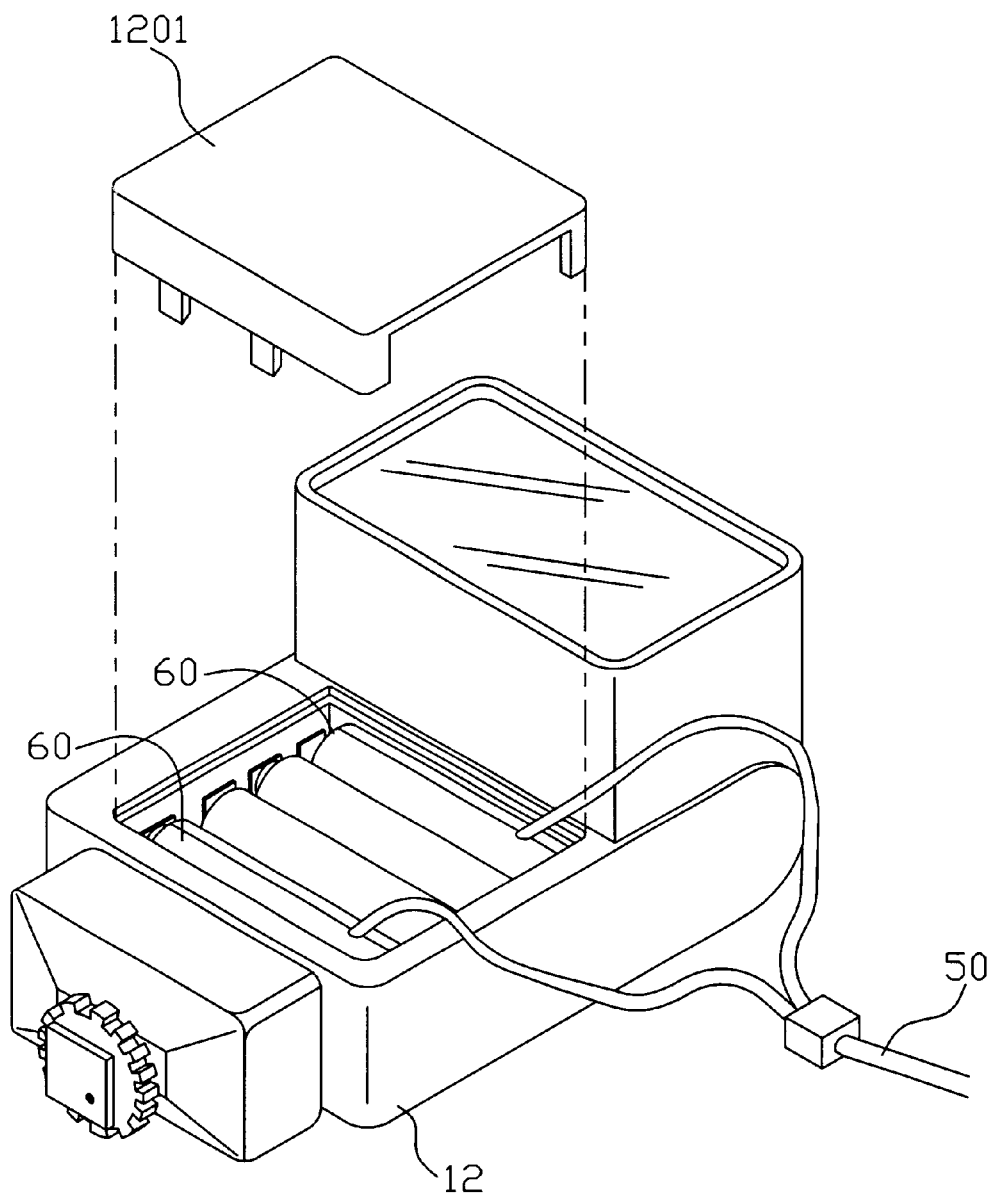
FIG. 5 illustrates how to fit the cylinders into the battery chamber of the flash.
Figure 6:
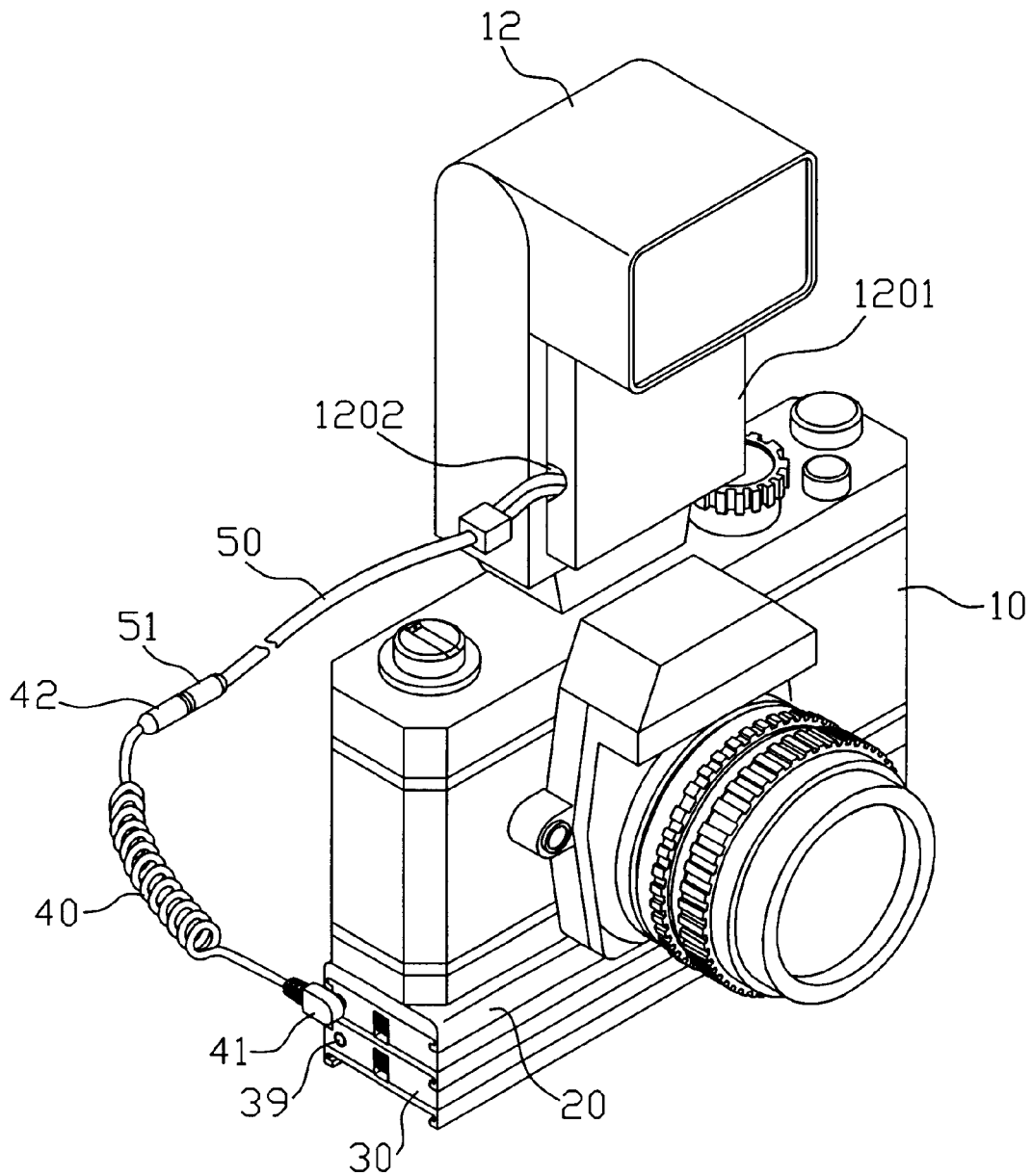
FIG. 6 is a working view of the present invention.
Figure 7:
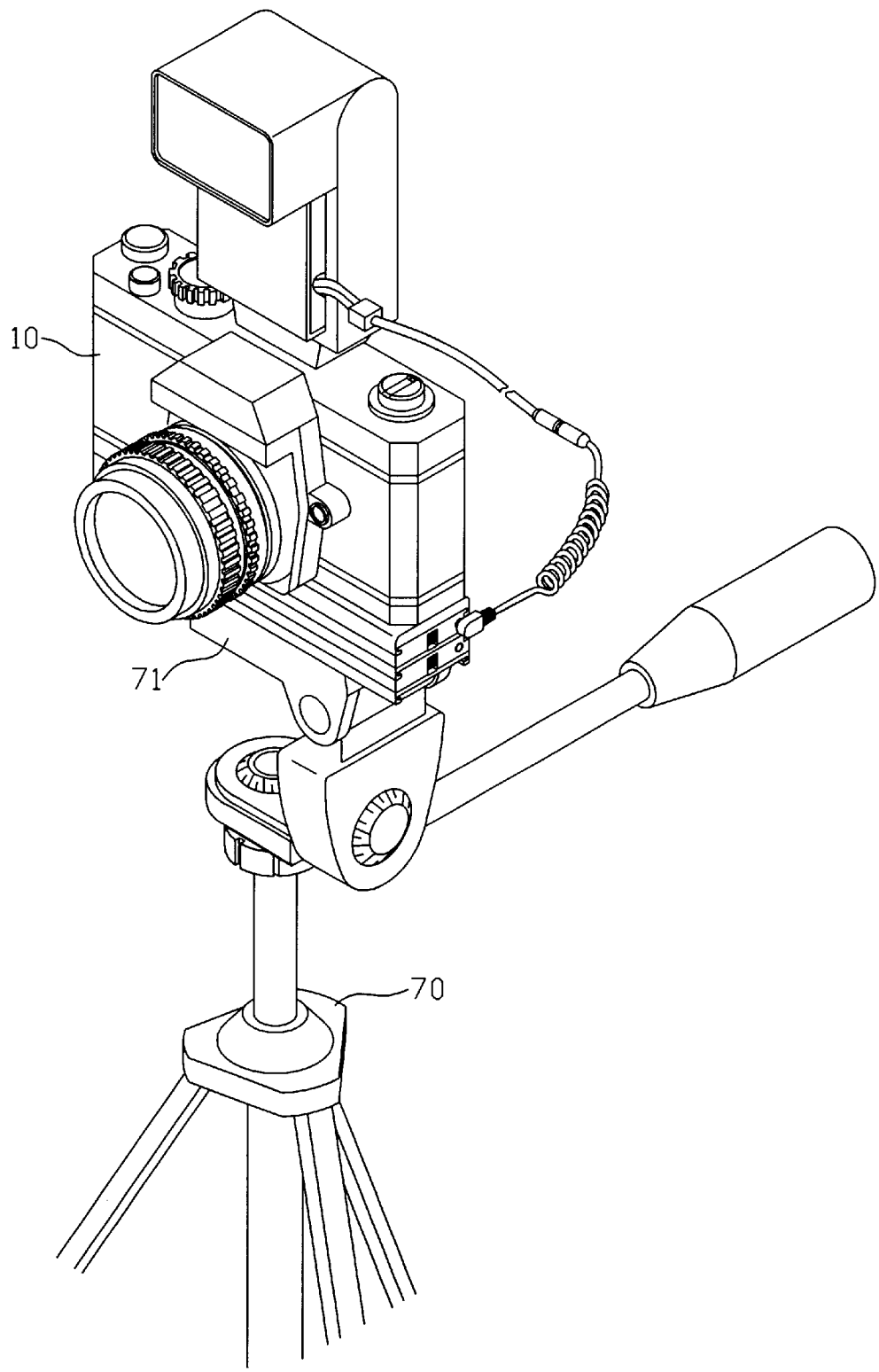
FIG. 7 is another working view of the present invention.
Figure 8:
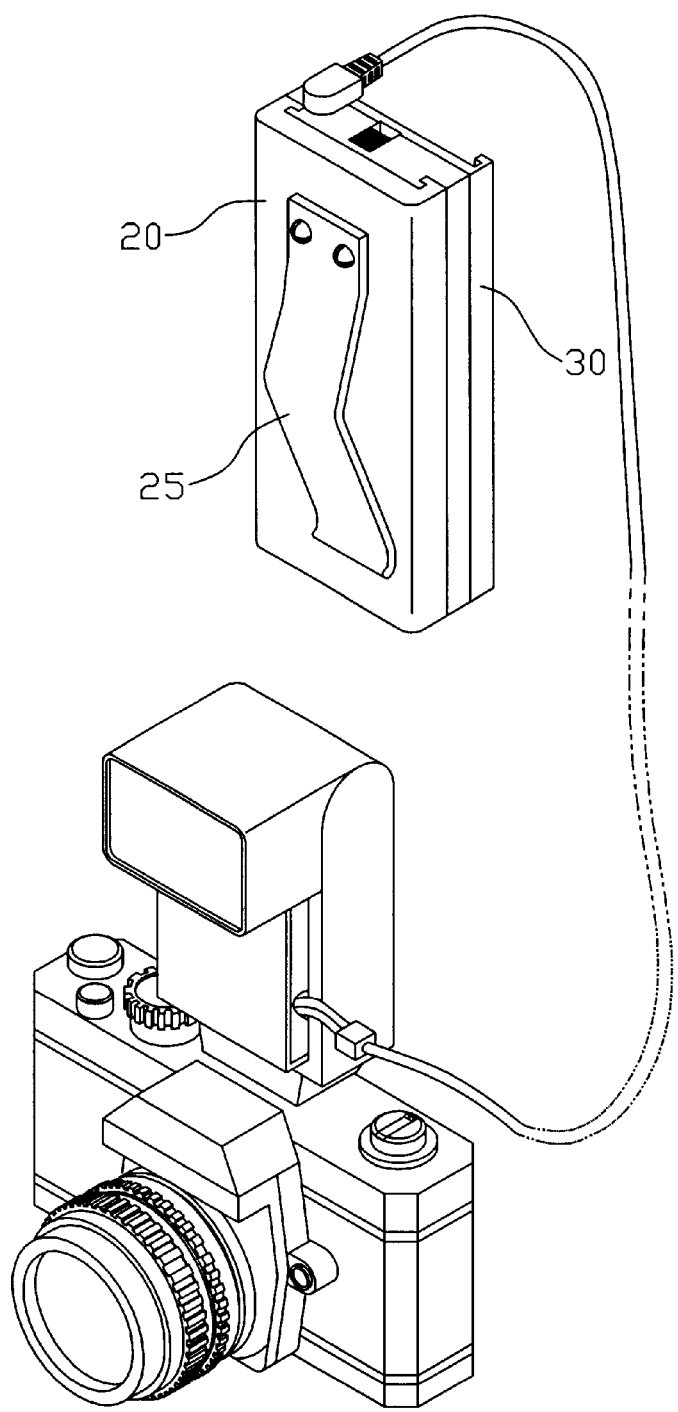
FIG. 8 is another working view of the present invention.

Referring to FIGS. 5 and 6, a notch 1202 is first made in the battery case 1201 of the flash 12 for the passage of the wires of the cylinders 6. When in use, two batteries are removed from the battery case 1201 and replaced with the two cylinders 60. Then, the plug 51 of the power cord 50 is inserted in the socket 42 of the extension cord 40 and the plug 41 of the extension cord 40 is fitted in the power socket 39 of the rechargeable battery 30. Thereafter, the base 20 is mounted on the bottom of the camera 10 by a screw 23. As shown in FIG. 7, the camera 10 together with the present invention can be installed on the camera platform 71 of the tripod 70. As shown in FIG. 8, a clip 25 is mounted on the base 20 so that the batteries 30 can be held on the waist as desired.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A power supplying device for flashes comprising:

a base having a bottom formed with two opposite grooves, a threaded hole vertically extending therethrough, and two threaded holes;

at least a rechargeable battery having a top provided with two conducting terminals and a protuberance, said protuberance being connected to a button slidably fitted in one end of said battery, two opposite sides of said battery being formed with two longitudinal flanges configured to engage with said grooves of said base, a bottom of said battery being provided with two grooves configured to engage with two flanges of a similar battery, a conducting member and a recess respectively engageable with a conducting terminal and protuberance of a similar battery, a central portion of said battery having a vertical threaded hole adapted to engage with a camera platform of a tripod, and a power socket provided close to said button for supplying power;

an extension cord provided at one end with a plug engageable with said power socket of said battery and at another end with a socket; and a power cord having an end provided with a plug engageable with said socket of said extension cord and another end provided with a positive and negative wires each provided with a metal conductor, one of said wires having a buzzer, a circuit protecting switch and a metal conductor which are fitted within a cylinder with said metal conductor partially projected out of an end of said cylinder, another one of said wires being provided at an end with a metal conductor which is fitted within another cylinder and partially extends out of the another cylinder, said circuit protecting switch being used for cutting off power supply in case of short circuit and turning on said buzzer to arouse a user to check polarity.

\* \* \* \* \*